March 8, 1932.  H. E. SWANSON  1,848,397
CLUTCH FOR BACKFILLERS
Filed Feb. 13, 1929  4 Sheets-Sheet 2

March 8, 1932.   H. E. SWANSON   1,848,397
CLUTCH FOR BACKFILLERS
Filed Feb. 13, 1929   4 Sheets-Sheet 3

Inventor:
Hilbert E. Swanson
John C. Carpenter
Atty.

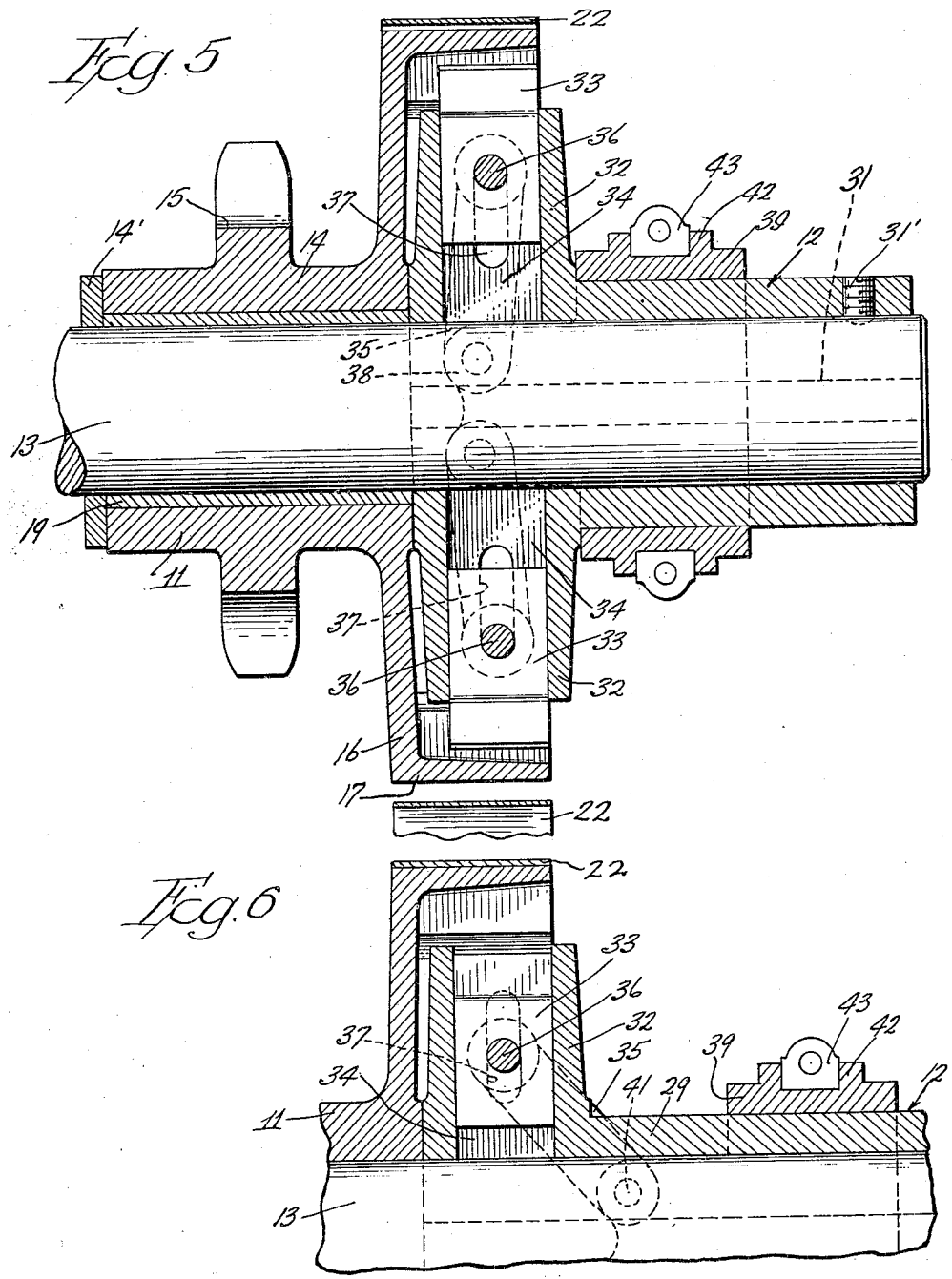

Patented Mar. 8, 1932

1,848,397

UNITED STATES PATENT OFFICE

HILBERT E. SWANSON, OF MUSKEGON HEIGHTS, MICHIGAN, ASSIGNOR TO AUSTIN MACHINERY CORPORATION, OF MUSKEGON, MICHIGAN, A CORPORATION OF VIRGINIA

CLUTCH FOR BACKFILLERS

Application filed February 13, 1929. Serial No. 339,548.

This invention relates to clutches and has more particular reference to heavy duty clutches which are adapted to be locked in operative position and which have brake members associated therewith in such a manner that the driven member is held immobile when the clutch is inoperative. Such clutches are particularly well adapted for use in connection with the traction mechanism of heavy duty machines.

It is an object of this invention to provide a heavy duty clutch in which the driving member is positively locked in engagement with the driven member.

Another object is to provide such a heavy duty clutch having a brake member associated with the driven member, whereby the driven member is held immobile when the clutch is thrown out.

Another object is to provide a single control to operate both the driving member and the brake member, the parts being so constructed and arranged that said single control may be arranged in desired location.

Numerous other objects and advantages of the invention will be apparent as it is better understood from the following description, which, taken in connection with the accompanying drawings, discloses a preferred embodiment thereof.

Referring to the drawings:

Fig. 3 is an enlarged view similar to Fig. 2 and with certain parts omitted for clearness;

Fig. 4 is a cross section through the clutch taken along the line 4—4 of Fig. 3;

Fig. 5 is a cross section through the clutch taken on the line 5—5 of Fig. 3;

Fig. 6 is a fragmental cross section, similar to Fig. 5, showing certain parts in different positions;

Fig. 7 is a perspective view of a portion of the control linkage;

Fig. 8 is a plan view of the guide and holding plate associated with the control handle, and Fig. 9 is a perspective view of the sliding collar which actuates the engaging parts of the driving member.

Figure 1:
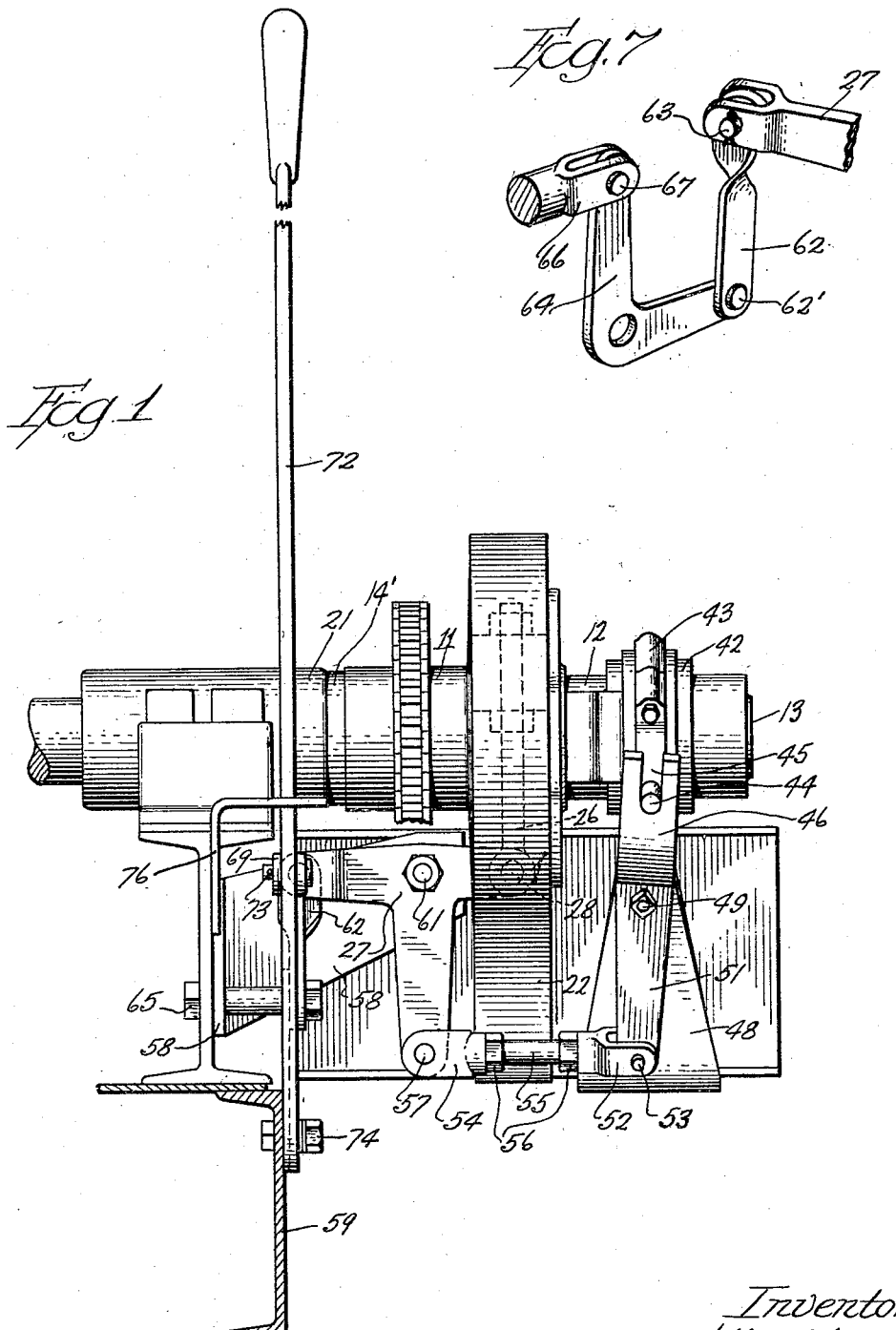
Figure 1 is a side elevation of my improved clutch.

Referring now to the drawings in more detail, the clutch shown is composed of a driven member 11 and a driving member 12, both carried upon a drive shaft 13, which extends through a bearing 21 secured to a portion of the frame 59 of the machine. The driven member consists of a body portion 14 which carries a chain sprocket 15 near its mid-length and which has a drum 16 formed at one end. The body portion 14 is bushed to the drive shaft 13 by a bushing 19, a washer collar 14' being interposed between the body and the housing of the bearing 21 to limit the movement of the body in that direction. Movement of the body in the opposite direction is prevented by the driving member 12. The drum portion 16 of the driven member is formed with a smooth cylindrical outer surface 17 which acts as a brake drum surface. The inner portion of the drum is formed with teeth or lugs 18, the space between the teeth being greater than the thickness of a tooth.

The driving member 12 consists of a body 29 at one end of which is a disc 32' upon which are formed two diametrically opposite housings 32 positioned within the drum 16 of the driven member. A key 31 serves to positively connect the body 29 of the driving member to the drive shaft 13, a set screw 31' serving to prevent axial movement of the body. A sliding collar 39 surrounds the body 29 and is a part of the mechanism to control the operation of the clutch. Annular ribs 42 are formed upon the body near its central portion, the space between them forming a groove in which a two-piece yoke band 43 is seated. This yoke band carries a pair of studs 44 positioned diametrically opposite each other and which serve to connect the sliding collar to an engaging and releasing control to be described later. Two arms 38 extend from diametrically opposite sides of one end, each arm being a double clevice provided with clevice pin holes 41'. Toggle links 35 are secured within the clevice arms 38 by clevice pins 41 and extend to and alongside of the housings 32 previously described.

Dogs 33 are positioned to slide within the housings 32 moving radially with respect to the drive shaft 13, each dog being connected to a pair of toggle links 35 by means of a pin 36 extending through the links, the dog, and slots 37 formed in the side of the housing. As the collar is moved toward the disc the dogs are moved radially away from the drive shaft under the action of the toggle links and engage the teeth of the drum 16, bringing the parts into operative relationship. The dogs reach the limit of their movement before the collar has reached the end of its travel, further movement of the collar moving the toggle links through an over-center throw, whereby the dogs are securely locked into position. As the collar is moved away from the disc, the first movement unlocks the toggle links, further movement retracting the dogs from active operative engagement with the teeth of the drum.

Movement of the collar 29 is accomplished by a yoke 47, the arms 46 of which are provided with slots 45 which engage the studs 44 on the yoke band 43 previously described, the yoke being pivoted by a bolt 49 to a bracket 48 extending from a portion of the frame 59. The lever arm 51 of the yoke is secured to a clevice 52 by a clevice pin 53, the clevice being attached to a rod 55. A second clevice 54 is attached to the other end of the rod 55, nuts 56 being provided to permit adjustment. The second clevice 54 is attached to the long arm of a T-crank 27 by a clevice pin 57 and the T-crank is pivoted to a bracket 58 by a bolt 61, the bracket extending from a portion of the frame 59.

The brake member associated with the drum 16 is composed of a brake strap 22 secured at one end to the frame, at 23, and formed to partly surround the surface 17 of the drum. A yoke 24 is securely attached to the other end of the band, the yoke having a pair of arms 25 spaced apart and adapted to receive a brake rod 26. This rod 26 is secured at one end to the yoke by nuts 26', the other end of the rod being secured to a clevice formed on one of the short arms of the T-crank 27 by a clevice pin 28.

The remaining short arm of the T-crank, which is also formed with a clevice, is fastened to a link 62 by a clevice pin 63. The link 62 is in turn fastened to one arm of a bell-crank 64 by a pin 62', the bell-crank being pivoted to the bracket 58 by a bolt and sleeve 65. The other arm of the bell-crank is pinned to a clevice 66 by a clevice pin 67, the clevice being mounted upon one end of a rod 68. Another clevice 69 is mounted upon the other end of the rod, nuts 71 being provided to permit adjustment. The clevice 69 is secured to a control lever 72 by a clevice pin 73, the lever being pivoted to the frame 59 by a bolt 74 and held in a slot 75 in a guide bracket 76 secured to the frame 59. The slot 75 is formed with an enlarged portion 77 providing a shoulder 78 behind which the lever is engaged when the clutch is in operation.

As has been described, the inner surface of the drum 17 is dentate and the teeth preferably have inclined operate or side faces. That is to say, these faces are angularly arranged (with respect to the normal) to the circumferences. Like or matching faces are provided upon the teeth engaging dogs of the driving member. The toggle action of the arms 35 holds these parts in clutching relation and the inclined relation of the faces facilitates engagement and disengagement.

Figure 2:
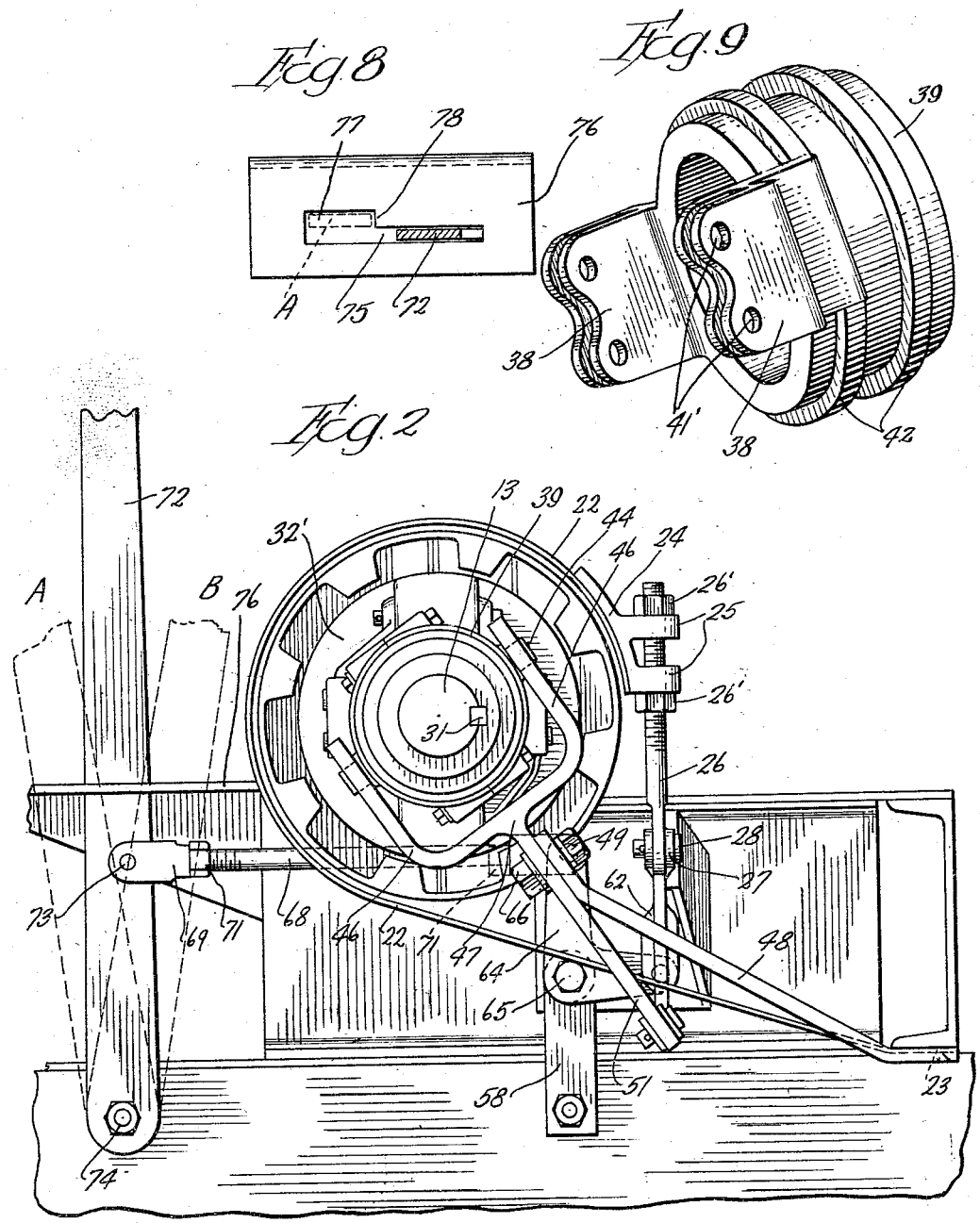
Fig. 2 is an end elevation of the same.

The action of the clutch and brake mechanisms, as actuated by the control lever, can best be explained from Figs. 1, 2 and 7. When the control lever is in the position "A", as shown in dotted lines in Fig. 2, the clutch is disengaged and the brake is set. Movement of the lever to the right causes the rod 68 to move to the right, rotating the bell-crank 64 in a clockwise direction (Fig. 1). This pulls down the link 62 and rotates the T-crank in a counter-clockwise direction (Figs. 2 and 7). The brake rod 26 is moved upward, releasing the brake band from the drum and at the same time the rod 55 is moved to the right, rotating the yoke lever 51 in a counter-clockwise direction, which moves the sliding collar 39 to the left or towards the disc of the driving member, engaging the dogs 33 as previously explained. As the control lever is moved to the left, all of the actions just described are reversed, releasing the clutch and setting the brake.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a clutch mechanism, the combination of driving and driven clutching members, a said member having a dentate inner surface, the other said member having radially arranged projections extending toward said surface, radially moving dogs carried by said projections and adapted for engaging with the teeth of said surface, pins extending through said projections and through said dogs, and means engaging said pins exterially of said projections for projecting and retracting said dogs.

2. In a clutch mechanism, the combination of driving and driven clutching members, a said member having a dentate inner surface, the other said member having radially arranged projections extending toward said surface, radially moving dogs carried by said projections and adapted for engaging with the teeth of said surface pins extending through said projections and through said dogs, and means engaging said pins exterially of said projections for projecting and retracting said dogs, said means comprising links passing over pivotal centers into toggle position in the projection of said dogs.

HILBERT E. SWANSON.